United States Patent
Bansal et al.

(10) Patent No.: US 10,101,789 B2
(45) Date of Patent: Oct. 16, 2018

(54) BATTERY MANAGEMENT IN WIRELESS MESH NETWORKS

(71) Applicant: HONEYWELL INTERNATIONAL INC., Morristown, NJ (US)

(72) Inventors: Sameer Bansal, Karnataka (IN); Vinayak Sadashiv Kore, Karnataka (IN)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 690 days.

(21) Appl. No.: 13/962,188

(22) Filed: Aug. 8, 2013

(65) Prior Publication Data
US 2015/0042484 A1 Feb. 12, 2015

(51) Int. Cl.
*G06F 1/00* (2006.01)
*G06F 1/32* (2006.01)
(Continued)

(52) U.S. Cl.
CPC ........... *G06F 1/3212* (2013.01); *G08B 29/00* (2013.01); *H04W 52/0277* (2013.01); *Y02D 70/00* (2018.01); *Y02D 70/22* (2018.01)

(58) Field of Classification Search
CPC .. G06F 1/3212; H04W 52/0277; G08B 29/00; Y02B 60/50
See application file for complete search history.

(56) References Cited

U.S. PATENT DOCUMENTS 5,164,652 A * 11/1992 Johnson .............. H01M 6/5066
320/106
6,026,303 A * 2/2000 Minamisawa ........ H04W 84/20
455/446
(Continued)

FOREIGN PATENT DOCUMENTS

CN 101194293 A 6/2008
JP 2014204194 A * 10/2014 ........ H04W 52/0219
(Continued)

OTHER PUBLICATIONS

European search report and European search opinion for corresponding EP patent application 14178444.7, dated Dec. 15, 2014.
(Continued)

*Primary Examiner* — Christopher E. Everett
(74) *Attorney, Agent, or Firm* — Husch Blackwell LLP

(57) ABSTRACT

An apparatus and method including the steps of providing a plurality of wireless devices in a security system having a controller wherein each of the plurality of wireless devices registers with the controller and wherein at least one of the plurality of wireless devices operating as a child device registering with the controller through another of the plurality of wireless devices operating as a parent device, a processor of the security system monitoring a charge state of a respective battery that powers each of the plurality of wireless devices and a processor dynamically adjusting an electrical load within the plurality of wireless devices based upon the monitored charge state of the respective battery of the wireless devices in order to delay a first low battery warning from any of the plurality of wireless devices as much as possible thereby reducing site visits by a battery installer.

18 Claims, 1 Drawing Sheet

(51) Int. Cl.
*G08B 29/00* (2006.01)
*H04W 52/02* (2009.01)

(56) References Cited

U.S. PATENT DOCUMENTS

| | | | | |
|---|---|---|---|---|
| 8,009,054 B2* | 8/2011 | Reams | ................ | G01R 31/362 |
| | | | | 324/426 |
| 8,046,180 B2 | 10/2011 | Huseth et al. | | |
| 8,166,822 B1* | 5/2012 | Urbano | ............... | G01S 7/52073 |
| | | | | 600/437 |
| 8,223,744 B2* | 7/2012 | Goldberg | ................. | H04Q 9/00 |
| | | | | 370/350 |
| 2006/0273896 A1* | 12/2006 | Kates | ................ | G08B 21/0236 |
| | | | | 340/539.18 |
| 2007/0185660 A1* | 8/2007 | Anderson | ......... | H04W 52/0219 |
| | | | | 702/41 |
| 2009/0168653 A1* | 7/2009 | St Pierre | ................ | H04L 45/00 |
| | | | | 370/238 |
| 2010/0195574 A1* | 8/2010 | Richeson | ............... | G01D 4/004 |
| | | | | 370/328 |
| 2012/0032682 A1* | 2/2012 | Robertson | ............ | H02J 7/0034 |
| | | | | 324/433 |
| 2012/0275361 A1* | 11/2012 | Berenberg | ............ | H04W 48/16 |
| | | | | 370/311 |
| 2013/0045759 A1* | 2/2013 | Smith | ................... | H04W 64/00 |
| | | | | 455/456.6 |
| 2013/0067063 A1* | 3/2013 | Vasseur | ................ | H04L 45/026 |
| | | | | 709/224 |
| 2013/0245973 A1* | 9/2013 | Ross, Jr. | ........... | G01R 31/3627 |
| | | | | 702/63 |
| 2013/0315257 A1* | 11/2013 | Welin | ..................... | H04L 45/12 |
| | | | | 370/401 |
| 2014/0293852 A1* | 10/2014 | Watanabe | ........ | H04W 52/0277 |
| | | | | 370/311 |
| 2014/0370939 A1* | 12/2014 | Ritter | ................ | G01R 31/3648 |
| | | | | 455/572 |

FOREIGN PATENT DOCUMENTS

| | | |
|---|---|---|
| WO | WO 03/015452 A2 | 2/2003 |
| WO | WO 2007/092522 A2 | 8/2007 |
| WO | WO 2013/062613 A1 | 5/2013 |

OTHER PUBLICATIONS

First Office Action and Search Report from corresponding CN patent application 201410591233.3, dated Dec. 22, 2017.

English-language translation of First Office Action and Search Report from corresponding CN patent application 201410591233.3, dated Dec. 22, 2017.

English-language translation of abstract for CN patent application 101194293, dated Jun. 4, 2008.

* cited by examiner

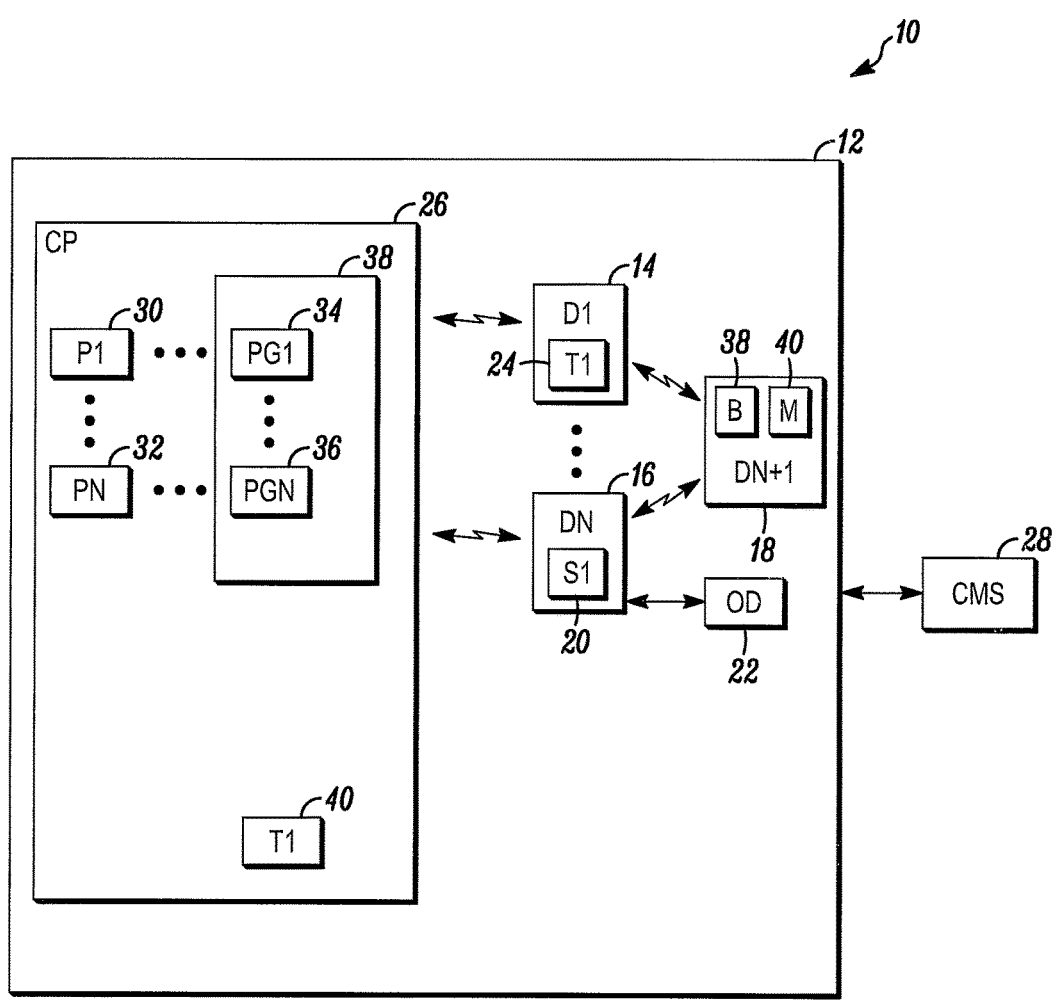

BATTERY MANAGEMENT IN WIRELESS MESH NETWORKS

FIELD

The field relates to security systems and more particularly to battery use within wireless devices of such security systems.

BACKGROUND

Security systems are generally known. Such systems typically include one or more sensors used within a secured area to detect threats to safety or health. In this regard, the sensors may include environmental detectors (e.g., smoke, natural gas, etc.) or intrusion detectors. The intrusion detectors may be provided as limit switches on doors or windows that surround the secured area and used to detect entry into the secured area or as motion detectors that detect motion within the secured area.

The sensors in turn may be connected to a control panel. Upon activation of one of the sensors, the control panel may send an alarm message to a central monitoring station including an identifier of the location of the alarm. The central monitoring station may, in turn, dispatch the appropriate help (e.g., police, fire department, etc.).

In many recent systems, the sensors used are based upon a wireless technology. The use of wireless sensors is based upon a need to reduce the cost of installing security systems in existing facilities.

While wireless sensors work well, the reliability of such system is based upon the functionality of the batteries that power such sensors. In this regard, if a battery that powers a sensor becomes depleted, then an intruder could enter a protected space without raising an alarm or a fire event will go unnoticed causing damage and loss. Accordingly, a need exist for better methods of ensuring the reliability of the batteries that power the sensors of such systems.

BRIEF DESCRIPTION OF THE DRAWING

FIG. 1 is a block diagram of a security system shown generally in accordance with an illustrated embodiment.

DETAILED DESCRIPTION OF AN ILLUSTRATED EMBODIMENT

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 depicts a security system 10 shown generally in accordance with an illustrated embodiment. Included within the system is a number of wireless devices 14, 16, 18 used to protect a secured area 12. At least some of the devices include a respective environmental sensor 20. The environmental sensor may detect environmental hazards via an appropriate sensor device (e.g., smoke detector, natural gas detector, fire detector, etc.). Alternatively, the sensor may be a limit switch on a door or window that detects the opening of the door or window by an intruder.

The wireless devices may be monitored by a control panel (controller) 26. Upon activation of a sensor of one of the wireless devices, the controller may send an alarm message to a central monitoring station 28. The alarm message may include an identifier of the secured area (address), an indicator of the type of alarm (e.g., intrusion, fire, etc.) and a relative location of the wireless sensor device within the secured area.

Included within the controller and each of the wireless devices is circuitry that provides the respective functionality of each device. The circuitry may include one or more processor apparatus (processors) 30, 32 operating under the control of one or more computer programs 34, 36 loaded from a non-transitory computer readable medium (memory) 38. As used herein, reference to a step of a program is also reference to the processor that executed that step.

In this regard, an alarm processor may monitor each of the wireless devices. Upon detection of the activation of one of the sensors, the alarm processor may compose the alarm message sent to the central monitoring station. In addition to sending the alarm message to the central monitoring station, the alarm processor may activate a local audio and/or visual output device 22 included within or attached to one of the wireless devices.

Included within the controller is a wireless transceiver 40. The transceiver of the controller is used to exchange messages with a corresponding transceiver 24 within each of the wireless devices.

Communication between the controller and wireless devices may be accomplished via any of a number of different methodologies. For example, the security system may automatically arrange itself into a communication system under a time division multiplexed (TDM) format where each wireless device is assigned to a particular slot of a transmission frame and multiframe. Similarly, the controller and each wireless device may be provided with a list of operating frequencies and operate under a frequency hopping format in combination with the TDM format.

Following the initial activation of the system, each of the wireless devices may tune to a default frequency and transmit registration messages directed to the controller. Those wireless devices closest to the controller may receive an acknowledgement of their registration messages and a downloaded file including a set of communication protocols to be used in communicating with the controller. The protocol may be a computer program that defines the protocol or simply a set of parameters used to implement the protocol. For example, a communication processor of the controller may download information that operates to assign each wireless device that it detects to a specific respective slot of a TDM frame and to a specific frequency hopping sequence.

Other wireless devices (e.g., wireless device 18) may be too far from the controller to communicate directly with the controller. In this case, the wireless device 18 may identify any nearby wireless devices 14, 16 and register with the controller as a child device through one of the other parent devices 14, 16.

In this regard, the parent may receive the registration message from the child device and re-transmit the registration message to the controller. The controller may assign the child device to particular TDM slot and hopping sequence. The parent device may exchange messages on behalf of the child device with the controller on the assigned TDM slot and sequence. The parent device may also assign a different TDM slot and hopping sequence for exchanging messages with the child device.

Alternatively, the controller may register each wireless device within the system and allow the devices to access the controller under a contention format. In this regard, transmissions from devices closer to the controller are more likely to be detected than devices that are relatively further from the controller. In this case, devices closer to the controller may act as parent devices that retransmit messages from devices that are relatively further away from the controller.

Included within each of the wireless devices is a respective battery 38 that powers the device. Using the processes discussed above, the wireless devices establish themselves as a mesh network coupled between various input and output devices of the security system.

Mesh networks of battery powered devices may be deployed in various applications such as wireless safety, security, comfort and industrial control systems. As the replacement of batteries is a maintenance task, it is desirable that service personnel change batteries at some minimal time interval.

However, the determination of the minimal time interval may be difficult to ascertain. For example, due to the very nature of mesh networks, some nodes are involved in routing a greater number of messages resulting in faster battery consumption as compared to other nodes in the network.

In addition, some wireless devices have application circuits that consume higher levels of power than some other devices. For example, in a wireless fire system, an audible alarm or strobe consumes more power than a simple smoke detector when activated.

Further service persons often ignore instructions that recommend the use of fresh batteries and not mixing old and new batteries. All of these factors lead to non-uniform battery life of the devices which can result in frequent visits by service personnel to replace the batteries.

The system of FIG. 1 addresses these problems via a number of unique processing techniques. For example, each of the wireless devices of FIG. 1 has a monitoring sensor 40 that detects battery parameters. For example, the monitoring sensor may be a voltage sensor that senses a voltage of the battery. Alternatively, the monitoring sensor may be an ampere sensor that detects an instantaneous current being drained from the battery.

In this regard one or more battery charge state processors within each of the wireless devices may monitor a state of the battery and report the state to a corresponding set of one or more battery charge state processors within the controller or wireless device. For example, a first battery state processor may precisely measure a voltage of the battery and determine a battery type (e.g., lithium-ion, nickel-cadmium, etc.) from the voltage. The processor may determine a percent of total remaining charge based upon a set of discharge curves retained within memory.

Alternatively, or in addition, a charge tracking processor may monitor an instantaneous current being drawn from the battery. In this regard, most batteries have a total energy storage capacity rating in milliamp or micro-amp hours. By measuring the instantaneous load on the battery, the charge tracking processor is able to measure a current load in milliamp or micro-amp hours and retain a value of total charge removed (in milliamp or micro-amp hours) from the battery.

Under still another alternative, the current drawn for each mode of operation may be measured for each device during manufacture and saved in memory. One or more mode processors within the device may measure the time of operation in each mode. Using the predetermined value of current drawn in each mode, the mode processor may calculate a charge state indicating a battery status by summing the total current drawn by time period across all modes.

Within the controller or one of the wireless devices is a battery load balancing processor. The load balancing processor retrieves a current battery status for each of the wireless devices within the system. Based upon the determined status, the load balancing processor may determine or otherwise predict the battery life of each wireless device. The load balancing processor may do this based upon a current charge remaining in the battery (e.g., in milli or micro-amp hours) and the current discharge rate in milli or micro-amps.

In this regard, the load processors of the system may operate under at least four different programs. The first may be a precise battery prediction program. The second program operates using the precise battery voltage monitoring circuit and readjusts the battery prediction program based upon the battery voltage. The third program uses proactive routing in the parent-child relationship to balance power consumption among mesh nodes and the fourth program uses a reactive routing in the parent-child relationship to maximize device functionality based upon remaining battery capacity.

In this regard, the wireless devices (mesh nodes) are each powered from batteries (battery sets) which are made by series and/or parallel combinations of batteries with established discharge curves for each given type of loading pattern. The discharge curves are saved in one or more respective memory of the system.

The battery prediction program operates based upon continuous measurements of current consumption or based on practical observations of current consumption in various operational/functional modes and is used to obtain the remaining battery life for each given battery chemistry, type and capacity. For example, a tracking processor may track the total energy required for a wireless device to perform some repetitive operation (e.g., measure an environmental parameter, compare the measured parameter with a threshold level and report the result to the controller, etc.) and the number of times per period (e.g., per 24 hour period) that this task if performed. The total energy left within the battery may be divided by this required energy per day to predict the remaining life of the battery.

This first program assumes that fresh batteries with reasonable time on-shelf before installation. Based upon actual use of the node over time, the battery consumption and remaining battery life is precisely calculated.

The second program is based upon similar concepts. In this regard, the battery prediction program can be less than completely accurate if a used set of batteries or old batteries (i.e., batteries on shelf for too long) or a mix of old and new batteries are used. In order to accommodate this possibility, the second program uses the voltage monitoring circuit to determine where on the discharge curve, a battery is then operating. The established remaining capacity is then fed back to the battery prediction program to accommodate any unexpected deviations from the prediction curve for that battery.

The proactive routing program (and processor executing that program) are used to balance power consumption among mesh nodes. In the mesh network of the system, each node's power consumption depends on a number of messages routed through that node. In mesh networks which operate under a contention mode, the number of routed messages and number of re-tries determines the on-time and number of transmissions (and power consumed). In the case of mesh networks operating under a TDM format, the number of messages routed through a node relates to the number of child nodes and, hence, the node's transmit and receive duty cycle. For a given type of node, its application circuits and continuous power consumption, the node is dynamically assigned an appropriate level of routing functionality (i.e., number of child devices) in order to obtain a substantially uniform level of power consumption across all devices. For example, the devices which consume a higher average level of power during normal operation are assigned less routing functionality (i.e., few child devices). In contrast, devices which consume less power for normal operation are assigned a higher number of routing tasks (and more child devices).

The reactive program processor assigns routing tasks based upon remaining battery capacity. Over time, some devices may consume more power at times due to reasons related to application circuitry such as more than a desired number of activations. For example if an audible alarm in a wireless fire system is activated for a long duration, its battery will be consumed to a greater extent.

At other times, unexpected communication on a wireless mesh can lead to a higher level of power consumption. For example, a mesh node which has a weak link with its neighbor nodes (e.g., poor signal transmission due to an intervening metal barrier) needs to re-transmit messages more frequently resulting in increased battery drain. To achieve uniform battery life in such cases, the devices are freed of any message routing requirements by transferring routing needs or child devices to other devices with relatively high reserve battery capacity.

A similar reassignment happens when the battery level monitoring circuit shows lesser or more remaining battery capacity than that estimated by the prediction program. The prediction program, in this case, corrects the excess capacity by assigning more routing tasks to the device as indicated by the monitoring circuit.

As a specific example, assume that the wireless devices 14, 16 are smoke/fire detectors and wireless device 18 is an intrusion detector. Assume also that wireless devices 14, 16, 18 have the same general relationship with regard to each other and with the controller 26 as is indicated generally in FIG. 1. In this regard, wireless devices 14, 16 would register directly with the controller based upon their relatively close relationship with the controller.

Assume also that wireless device 18 is too far from the controller to exchange wireless messages with the controller. In this case, the wireless device 18 may be equidistant with wireless devices 14, 16 and may register with the controller through the wireless device 16. In this circumstance, wireless device 18 is the child device and wireless device 16 is the parent device.

During normal operation, the battery charge state processor(s) may measure a voltage of the battery of each device and the current being drawn from each battery. The battery voltages may be sent to the battery prediction processor where an estimated life of each battery may be determined. Similarly, the current values may be accumulated for each battery and used by the charge tracking processor to determine the cumulative energy drawn from each battery and to predict the remaining life of each battery.

The predicted life for each battery based upon voltage and accumulated current values may be sent to a comparison processor that compare the predicted lifetimes and selects the smallest value. The predicted value may also be compared with one or more threshold values in order to determine the need for rearranging the loading within the system. The threshold values may be based upon absolute values or upon the relative discharge rates of each battery. For example, batteries that are being discharged much faster than other batteries may be singled out in a way that allows the device containing that battery to be assigned a lesser load in order to extend the life of that battery to a value that would be comparable to the lifetimes of the other batteries.

For example, wireless device 16 was assumed to be a smoke/fire detector and has an output device 22 that receives power from the device 16. During normal operation the wireless device 16 may be discharged relatively rapidly due to testing and to incidental fire events. Another wireless device 14, also operating as a fire/smoke detector, may have a very light loading. The comparison processor may detect a relatively large difference in relative lifetimes and send a message to the loading processor.

In response, the loading processor may first determine that the wireless device 16 is a parent device to child device 18. The loading processor may also determine that child device 18 is also within wireless communication range with wireless device 14. Based upon the rapid discharge of the battery of device 16, the loading processor may send instructions to child device 18 instructing the child device to disassociate itself from parent device 16 and to re-establish a connection to the controller through alternate parent device 14.

As time passes, the loading processor may continue to make loading changes within the system. Under one illustrated embodiment, the loading processor will attempt to identify the device with the longest and shortest predicted remaining lifetimes and make loading changes intended to have the most effect on those identified devices.

For example, in the case of the device 16 with the output device, the loading processor may determine that the predicted lifetime of the battery of this device 16 is still less than any other device within the system. In this case, the loading processor may reduce the loading on this device to some minimum level consistent with the required functionality. The loading processor may also post a notice on a user interface of the system notifying an operator of the change in functionality and reason for the change.

In general, the system provides the described functionality by executing the steps of providing a plurality of wireless devices in a security system having a controller wherein each of the plurality of wireless devices registers with the controller and wherein at least one of the plurality of wireless devices operating as a child device registering with the controller through another of the plurality of wireless devices operating as a parent device, a processor of the security system monitoring a charge state of a respective battery that powers each of the plurality of wireless devices and a processor of the controller dynamically adjusting an electrical load within at least some of the plurality of wireless devices based upon the monitored charge state of the respective battery of the at least some of plurality of wireless devices in order to delay a first low battery warning from any of the plurality of wireless devices as much as possible thereby reducing site visits by a battery installer.

In this regard, the apparatus described herein may include a controller of a security system, a plurality of wireless devices of the security system wherein each of the plurality of wireless devices registers with the controller and wherein at least one of the plurality of wireless devices operating as a child device that registers with the controller through another of the plurality of wireless devices operating as a parent device, a processor of the security system that monitors a charge state of a respective battery that powers each of the plurality of wireless devices and a processor of the controller that dynamically adjusts an electrical load within at least some of the plurality of wireless devices based upon the monitored charge state of the respective battery of the at least some of the plurality of wireless devices.

In other embodiments, the apparatus may include a security system, a controller of the security system, a plurality of wireless devices of the security system including a number of parent devices wherein each of the plurality of wireless devices registers with the controller and wherein at least one of the plurality of wireless devices operates as a child device that registers with the controller through the at least one of the number of parent devices, a processor of the security system that monitors a charge state of a respective battery that powers each of the plurality of wireless devices and a processor of the controller that dynamically adjusts an electrical load within at least some of the plurality of wireless devices based upon a parent-child relationship among and the monitored charge state of the respective battery of the at least some of the plurality of wireless devices.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
    providing a plurality of wireless devices in a security system having a controller, wherein each of the plurality of wireless devices registers with the controller, and wherein a first of the plurality of wireless devices operating as a child device registers with the controller through a second of the plurality of wireless devices operating as a parent device;
    a first processor of the controller monitoring a respective charge state of a respective battery that powers each of the plurality of wireless devices;
    the first processor of the controller determining a respective percent of total remaining charge for the respective battery that powers each of the plurality of wireless devices based on the respective charge state of the respective battery that powers a respective one of the plurality of wireless devices and a respective battery type of the respective battery that powers the respective one of the plurality of wireless devices; and
    a second processor of the controller dynamically adjusting an electrical load within the second of the plurality of wireless devices based upon the respective percent of total remaining charge for the respective battery that powers the second of the plurality of wireless devices in order to delay a low battery warning from any of the plurality of wireless devices,
    wherein adjusting the electrical load within the second of the plurality of wireless devices includes setting up a connection between the first of the plurality of wireless devices and the controller through a third of the plurality of wireless devices to reduce the electrical load on the second of the plurality of wireless devices, and
    wherein the second processor of the controller selects the third of the plurality of wireless devices because the third of the plurality of wireless devices consumes less power while performing an operation other than network communication than the second of the plurality of wireless devices.

2. The method as in claim 1 wherein the operation includes sensing an environmental parameter within a secured area of the security system.

3. The method as in claim 2 wherein the operation includes sensing one of smoke, fire, and natural gas.

4. The method as in claim 1 wherein the operation includes activating an audible alarm or a strobe.

5. The method as in claim 1 wherein monitoring the respective charge state of the respective battery that powers each of the plurality of wireless devices includes measuring respective a current consumption of the respective battery that powers each of the plurality of wireless devices or summing the respective current consumption of the respective battery that powers each of the plurality of devices versus time across all modes of operation.

6. The method as in claim 5 further comprising integrating the respective current consumption of the respective battery that powers each of the plurality of devices versus the time as a respective measurement of a respective energy removed from the respective battery that powers the respective one of the plurality of wireless devices.

7. The method as in claim 6 further comprising comparing the respective measurement of the respective energy removed from the respective battery that powers each of the plurality of wireless devices with an estimated energy of an unused battery.

8. The method as in claim 1 wherein monitoring the respective charge state of the respective battery that powers each of the plurality of wireless devices includes measuring a respective voltage of the respective battery that powers each of the plurality of wireless devices.

9. An apparatus comprising:
    a controller of a security system;
    a plurality of wireless devices of the security system, wherein each of the plurality of wireless devices registers with the controller, and wherein a first of the plurality of wireless devices operating as a child device registers with the controller through a second of the plurality of wireless devices operating as a parent device;
    a first processor of the controller that monitors a respective charge state of a respective battery that powers each of the plurality of wireless devices and determines a respective percent of total remaining charge for the respective battery that powers each of the plurality of wireless devices based on the respective charge state of the respective battery that powers a respective one of the plurality of wireless devices and a respective battery type of the respective battery that powers the respective one of the plurality of wireless devices; and
    a second processor of the controller that dynamically adjusts an electrical load within the second of the plurality of wireless devices based upon the respective percent of total remaining charge for the respective battery that powers the second of the plurality of wireless devices in order to delay a low battery warning from any of the plurality of wireless devices,
    wherein the second processor of the controller dynamically adjusting the electrical load within the second of the plurality of wireless devices includes setting up a connection between the first of the plurality of wireless devices and the controller through a third of the plurality of wireless devices to reduce the electrical load on the second of the plurality of wireless devices, and
    wherein the second processor of the controller selects the third of the plurality of wireless devices because the third of the plurality of wireless devices consumes less power while performing an operation other than network communication than the second of the plurality of wireless devices.

10. The apparatus as in claim 9 wherein the operation includes sensing an environmental parameter within a secured area of the security system.

11. The apparatus as in claim 10 wherein the operation includes sensing one of smoke, fire, and natural gas.

12. The apparatus as in claim 9 wherein the operation includes activating an audible alarm or a strobe.

13. The apparatus as in claim 9 wherein the first processor of the controller measures a respective current consumption of the respective battery that powers each of the plurality of wireless devices or sums the respective current consumption of the respective battery that powers each of the plurality of wireless devices versus time across all modes of operation.

14. The apparatus as in claim 13 wherein the first processor of the controller integrates the respective current consumption of the respective battery that powers each of the plurality of devices versus the time as a respective measurement of a respective energy removed from the respective battery that powers the respective one of the plurality of wireless devices.

15. The apparatus as in claim 14 wherein the first processor of the controller compares the respective measurement of the respective energy removed from the respective battery that powers each of the plurality of wireless devices with an estimated energy of an unused battery.

16. The apparatus as in claim 9 wherein the first processor of the controller measures a respective voltage of the respective battery that powers each of the plurality of wireless devices.

17. An apparatus comprising:
a security system;
a controller of the security system;
a plurality of wireless devices of the security system, wherein each of the plurality of wireless devices registers with the controller, and wherein a first of the plurality of wireless devices operates as a child device that registers with the controller through a second of the plurality of wireless devices;
a first processor of the controller that monitors a respective charge state of a respective battery that powers each of the plurality of wireless devices and determines a respective percent of total remaining charge for the respective battery that powers each of the plurality of wireless devices based on the respective charge state of the respective battery that powers a respective one of the plurality of wireless devices and a respective battery type of the respective battery that powers the respective one of the plurality of wireless devices; and
a second processor of the controller that dynamically adjusts an electrical load within the second of the plurality of wireless devices based upon a parent-child relationship and the respective percent of total remaining charge for the respective battery that powers the second of the plurality of wireless devices in order to delay a low battery warning from any of the plurality of wireless devices,
wherein the second processor of the controller dynamically adjusting the electrical load within the second of the plurality of wireless devices includes setting up a connection between the first of the plurality of wireless devices and the controller through a third of the plurality of wireless devices to reduce the electrical load on the second of the plurality of wireless devices, and
wherein the second processor of the controller selects the third of the plurality of wireless devices because the third of the plurality of wireless devices consumes less power while performing an operation other than network communication than the second of the plurality of wireless devices.

18. The apparatus of claim 17 wherein a subset of the plurality of wireless devices includes one of a fire sensor, a smoke sensor, and an intrusion sensor.

* * * * *